July 14, 1953 D. M. DOW 2,645,340
SUPPORTING DEVICE INVOLVING AN ELASTIC MEMBER
Filed July 15, 1949

INVENTOR.
Dewey M. Dow
BY
ATTORNEY

Patented July 14, 1953

2,645,340

UNITED STATES PATENT OFFICE 2,645,340

SUPPORTING DEVICE INVOLVING AN ELASTIC MEMBER

Dewey M. Dow, Toledo, Ohio, assignor to Air-Way Electric Appliance Corporation, Toledo, Ohio, a corporation of Delaware Application July 15, 1949, Serial No. 105,010

3 Claims. (Cl. 206—80)

1

This invention relates to supporting devices, but more particularly to supports utilizing an elastic strip which is stretched to admit the article to be supported and snugly and resiliently holds it against the supporting surface.

Difficulty has been experienced in anchoring the ends of a length of flexible elastic material, for example, of woven textile material embodying elastic threads, to a supporting surface. In the event that the ends of such material are secured to the support by staples, tacks or the like, the anchoring is ineffective due to the fact that when the elastic material is stretched, the cross sectional area is accordingly diminished and as a consequence, within a relatively short period of time, it becomes loosened. It is a desideratum to anchor the ends of an elastic piece in a simple and inexpensive manner and in such fashion that the ends will be secured for an indefinite period of time.

An object of this invention is to produce a simple and efficient device for securing or anchoring one or both ends of a length of flexible elastic material so that it will be securely retained over an extended period of time in spite of recurrent stretching.

Another object is to produce a support for tools employing an elastic strip, the ends of which are anchored in a new and improved manner to a supporting surface, the anchoring means being readily and simply applied to the support and the elastic strip being adapted to be conveniently assembled thereto in position of use.

Other objects consist in details of construction and arrangement, and for purposes of illustration but not of limitation, an embodiment of the invention is shown in the accompanying drawings, in which Figure 1 is a perspective view of a supporting panel showing one of the elastic strips in position of use for retaining or holding a floor tool for a suction cleaner and also showing a pair of anchoring members in position of use but without the elastic strip attached thereto and also showing a pair of spaced holes for receiving anchoring members;

2

Figure 1:
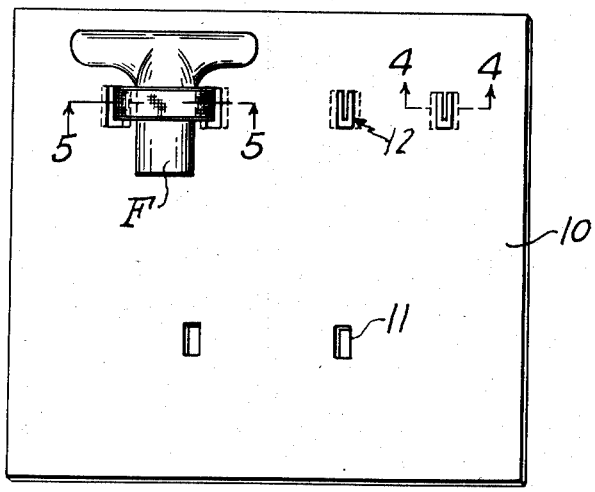
Figure 2:
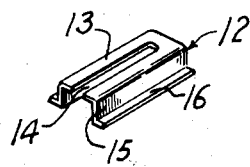
Figure 2 is a perspective view of the sheet metal anchoring member.
Figure 3:
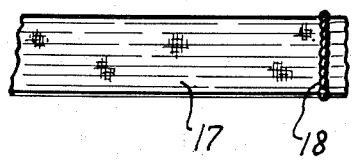
Figure 3 is an enlarged fragmentary view of the elastic strip showing the line of transverse stitching adjacent one end thereof.
Figure 4:
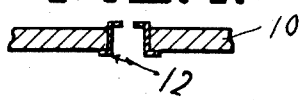
Figure 4 is an enlarged sectional view on the line 4—4 of Fig. 1.
Figure 5:
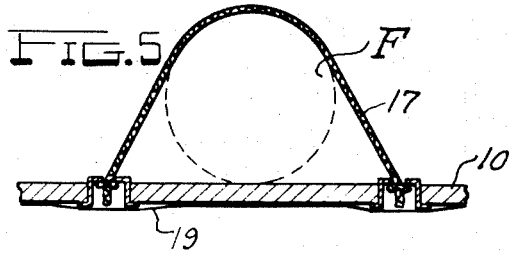
Figure 5 is an enlarged sectional view on the line 5—5 of Figure 1.

The illustrated embodiment of the invention comprises a supporting panel 10 of any suitable material such as fibre board, plywood, sheet metal or other sheet material having the desired feature of strength and reasonable rigidity. Formed on the panel 10 is any desired number of pairs of slots 11 depending upon the number of articles to be supported. Figure 1 illustrates three pairs of such openings. The slots or openings 11 are of oblong, rectangular shape of a size to admit anchor members 12 which are inserted into the slot from the rear face of the panel sufficient so that the upper face 13 which is formed with an open ended slot 14 is either flush with the outer surface of the panel 10 or approximately flush. The anchor member 12 which is of relatively light gauge sheet metal is substantially U-shaped in cross section and has parallel side walls 15 and right angular, outwardly extending flanges 16. The flanges 16 engage the rear side of the panel 10 adjacent the mouth of the slot 11 and hold the anchor member from being pulled all the way through the slot. The face or side 13 of the anchor member 16 is parallel to the flanges 16. The width of the slot 14 is so chosen relative to the elastic strip 17 so that the strip can be easily forced edgewise through the open end of the slot 14 and preferably the length of the slot is approximately the same as the width of the strip 17. The strip 17 is of woven textile material incorporating elastic threads to afford elasticity in a longitudinal direction.

To retain the end portions of the elastic strip 17 in engagement with the anchor members 12, a line of stitching 18 extending transversely from edge to edge of the strip 17 is applied near each end of the strip. This row of stitching is preferably formed by a relatively heavy thread so that a slight projection is formed on opposite sides of the strip 17. Thus when the strip 17 is inserted in the slot 14, the transverse row of stitching 18 provides a sufficient enlargement to the cross sectional dimension of the strip 17 as to prevent the strip from being pulled through the slot 14. Thus the row of stitching serves as a stop to hold the strip from being pulled through the slot.

Assembly of the strip and anchor members 12 is accomplished by first inserting the ends of the strip through a pair of slots respectively and on the rear face of the panel 10 applying the anchor members to the ends of the strip as above described. Then by inserting the anchor members into the slots 11, it will be manifest that the ends of the elastic strip 17 are securely anchored and remain anchored in spite of repeated stretching of the strip 17. It will be apparent that reduction of the cross sectional dimension of the elastic strip will not affect the row of stitching 18 to enable it to be pulled through the slot 13.

The rear face of the supporting panel 10 may be covered by a sheet 19 of paper or other suitable material to cover the flange ends of the anchor members 12 and insure their retention in the slots 11. The anchor members 12 may fit so snugly within the slots 11 that the sheet 19 may be unnecessary except to provide a neat finished appearance to the rear face of the panel.

F on Figure 1 illustrates the floor tool of a suction cleaner in which the tube portion is inserted beneath an elastic strip 17 which has been stretched to snugly embrace it and hold it securely to the panel. Thus by way of example, a panel equipped with a number of elastic strips anchored at their end portions may support the various tools required for a suction cleaner. Manifestly, the supports can be used for many other purposes and its use in connection with a suction cleaner is merely illustrative.

Although the embodiment of the invention has been described in connection with a strip of woven material involving elastic threads, it is to be understood that other elastic materials are contemplated such as a strip or cord of elastic rubber, and it is further contemplated that abutment means may be achieved by means other than a line or lines of stitching. For exmaple, the end of the strip or cord may be knotted or integral raised abutments may be formed to provide the desired stop surface. Other changes in details of construction, arrangement and choice of materials may be effected without departing from the spirit of the invention especially as defined in the appended claims.

What I claim is:

1. The combination of a supporting panel having a pair of spaced apertures, an anchor member in each aperture, each anchor member having an elongate slot open at one end, a strip of woven flat textile elastic material extending from one anchor member to the other, the thickness of the strip approximating the width of the slot in each anchor member, and a row of stitching extending transversely of said strip adjacent each end thereof thereby to provide a raised portion on each side of said strip, the end portions of said strip engaging in the slots of said anchor members respectively with the rows of stitching on the inside thereof thereby to enable the strip to be stretched relative to the anchor members and held to the anchor members by the rows of stitching.

2. In a support, the combination of a supporting panel having a pair of spaced apertures, a metallic anchor member in each aperture, each anchor member comprising flange means to engage the inner side of the panel, walls extending outwardly from the flange means and into the aperture, an end wall connected to said side walls and having an elongate slot open at one end, a strip of woven flat elastic textile material spanning said apertures and for engagement with said anchor members respectively by edgewise engagement therewith into said slots, the thickness of the strip approximating the width of the slots in said anchor members, and rows of stitching at each end of said strip projecting outwardly from opposite sides of the strip and to engage the inner face of said end wall at the edges of the aperture thereby to prevent the strip from becoming disengaged from the anchor member when the strip is stretched.

3. The combination of a supporting panel having a pair of spaced apertures, an anchor member in each aperture, each anchor member having an elongate slot open at one end, a strip of woven flat textile elastic material extending from one anchor member to the other, the thickness of the strip approximating the width of the slot in each anchor member, and stop means incorporated in and forming a part of each end of the elastic material to afford raised portions transversely of the strip, said stop means being respectively arranged to engage the inside edges of said slots thereby to enable the strip to be stretched relative to the anchor members and held thereto by the raised stop means.

DEWEY M. DOW.

References Cited in the file of this patent

UNITED STATES PATENTS

| Number | Name | Date |
| --- | --- | --- |
| 289,732 | Vogel | Dec. 4, 1883 |
| 2,067,386 | Frowenfeld et al. | Jan. 12, 1937 |
| 2,233,725 | Begin et al. | Mar. 4, 1941 |
| 2,270,702 | Getmansky | Jan. 20, 1942 |

FOREIGN PATENTS

| Number | Country | Date |
| --- | --- | --- |
| 364,022 | Germany | Nov. 16, 1922 |